United States Patent [19]
Takagishi et al.

[11] Patent Number: 6,013,737
[45] Date of Patent: Jan. 11, 2000

[54] DIENE RUBBER COMPOSITION

[75] Inventors: Yukio Takagishi; Masao Nakamura, both of Kawasaki, Japan

[73] Assignee: Nippon Zeon Co., Ltd., Tokyo, Japan

[21] Appl. No.: 09/029,545

[22] PCT Filed: Sep. 5, 1996

[86] PCT No.: PCT/JP96/02509

§ 371 Date: Mar. 5, 1998

§ 102(e) Date: Mar. 5, 1998

[87] PCT Pub. No.: WO97/09378

PCT Pub. Date: Mar. 13, 1997

[30] Foreign Application Priority Data

Sep. 5, 1995 [JP] Japan .................................. 7-251816

[51] Int. Cl.[7] .......................... C08F 279/04; C08L 39/00; C08K 3/34
[52] U.S. Cl. .................. 525/332.7; 525/374; 525/332.8; 525/259; 525/296; 524/492; 524/555
[58] Field of Search .............................. 525/332.7, 374, 525/332.8, 259, 296; 524/555, 492

[56] References Cited

U.S. PATENT DOCUMENTS

| | | | |
|---|---|---|---|
| 4,866,138 | 9/1989 | Chasar | 525/332.6 |
| 4,960,819 | 10/1990 | Sandstrom et al. | 524/516 |
| 5,189,109 | 2/1993 | Imai et al. | 525/296 |
| 5,247,009 | 9/1993 | Kitahara | 524/552 |

FOREIGN PATENT DOCUMENTS

| | | |
|---|---|---|
| 64-22940 | 1/1989 | Japan . |
| 1-101344 | 4/1989 | Japan . |
| 1-167347 | 7/1989 | Japan . |
| 1-167348 | 7/1989 | Japan . |
| 1-188501 | 7/1989 | Japan . |
| 5-230286 | 9/1993 | Japan . |

*Primary Examiner*—James J. Seidleck
*Assistant Examiner*—Olga Asinovsky
*Attorney, Agent, or Firm*—Armstrong, Westerman, Hattori, McLeland & Naughton

[57] ABSTRACT

A rubber composition comprising 100 parts by weight of a diene rubber ingredient containing an amino group-containing diene rubber, 10 to 120 parts by weight of silica, 0.1 to 15 parts by weight a vulcanizer and 0.1 to 15 parts by weight of a sulfenamide vulcanization accelerator.

This rubber composition exhibits excellent heat build-up, tensile property and abrasion resistance, and is suitable for tires and others.

13 Claims, No Drawings

DIENE RUBBER COMPOSITION

TECHNICAL FIELD

This invention relates to a rubber composition comprising a diene rubber and silica as a reinforcer. More particularly, it relates to a diene rubber composition having excellent tensile properties and abrasion properties.

BACKGROUND ART

In recent years, there is a strictly increasing demand for reducing a fuel consumption in automobiles from a standpoint of saving resources and conserving the environment. As for automobile tires, the reduction of rolling resistance is desired for the reduction of a fuel consumption. The reduction of rolling resistance is generally achieved by using a rubber material capable of giving a vulcanized rubber exhibiting a reduced heat build-up.

Recently it has been proposed to use a rubber composition comprising silica as a reinforcer and a diene rubber having introduced therein a substituent having affinity to silica, for lowering the heat build-up. As examples of the substituent having an affinity with silica, which is introduced in a diene rubber, there can be mentioned a tertiary amino group (Japanese Unexamined Publication No. 1-101344 and ibid. 64-22940), an alkyl-silyl group (Japanese Unexamined Patent Publication No. 1-188501) and a halogenated silyl group (Japanese Unexamined Patent Publication No. 5-230286). However, the reduction of heat build-up by the rubber composition comprising silica and a diene rubber having introduced therein a substituent having an affinity with silica is not to a sufficient extent, and tensile properties such as tensile stress and abrasion resistance are poor.

DISCLOSURE OF INVENTION

The object of the present invention is to provide a rubber composition comprising a diene rubber, silica, a vulcanizer and a vulcanization accelerator which exhibits a reduced heat build-up reduced to a sufficient extent and thus, gives a tire having a rolling resistance, and which has good tensile strength and abrasion resistance.

The present inventors conducted extensive research to obviate the problems encountered in the heretofore-proposed techniques, and found that a rubber composition comprising an amino group-containing diene rubber, silica, a vulcanizer and a specific vulcanization accelerator which exhibits a reduced heat build-up to a sufficient extent without reduction of tensile strength and abrasion resistance. The amino group-containing diene rubber can be used alone or, if desired, in combination with other diene rubbers. The present invention has been completed based on these findings.

In accordance with the present invention, there is provided a rubber composition comprising 100 parts by weight of a diene rubber, 10 to 120 parts by weight of silica, 0.1 to 15 parts by weight of a vulcanizer and 0.1 to 15 parts by weight of a vulcanization accelerator, characterized in that the diene rubber is (A) an amino group-containing diene rubber having a Mooney viscosity ($ML_{1+4}$, 100° C.) of 20 to 250 or a mixture of said amino group-containing rubber (A) with other diene rubber (B), and further that the vulcanization accelerator is a sulfenamide compound.

BEST MODE FOR CARRYING OUT THE INVENTION

Amino Group-containing Diene Rubber (A)

In the present invention, a specific diene rubber is used, which is (A) an amino group-containing diene rubber having a Mooney viscosity ($ML_{1+4}$, 100° C.) of 20 to 250, or a mixture of said amino group-containing diene rubber (A) with other diene rubber (B). The amino group-containing diene rubber (A) may be used alone or in combination of two or more. The other diene rubber also may used alone or in combination of two or more.

The amino group-containing diene rubber preferably has a Mooney viscosity ($ML_{1+4}$, 100° C.) of 30 to 150, more preferably 40 to 100. When the Mooney viscosity is in this range, the exothermic heat and the abrasion resistance are improved to a satisfactorily high level.

The amino group contained in the amino group-containing diene rubber may be any of a primary amino group, a secondary amino group and a tertiary amino group. However, to reduce the heat build-up and enhance the tensile properties and abrasion resistance to a greater extent, a primary amino croup and a tertiary amino group are preferable, and a tertiary amino group is especially preferable.

As examples of the amino group-containing diene rubber, there can be mentioned a copolymer of an amino group-containing vinyl monomer with a conjugated diene monomer, and a copolymer of an amino group-containing vinyl monomer with a conjugated diene monomer and an aromatic vinyl monomer.

The contents of the respective monomer units in the amino group-containing diene rubber vary depending upon the intended properties of the rubber. In the case of a copolymer of an amino group-containing vinyl monomer with a conjugated diene monomer, the content of the amino group-containing vinyl monomer is usually 0.01 to 20% by weight, preferably 0.05 to 15% by weight, and more preferably 0.1 to 10% by weight, and the content of the conjugated diene monomer is usually 80 to 99.99% by weight, preferably 85 to 99.95% by weight and more preferably 90 to 99.9% by weight. To obtain better and more balanced heat build-up property and wet-skid property, aromatic vinyl monomer units are further contained in the copolymer. In the case of this aromatic vinyl monomer-containing copolymer, the content of the amino group-containing vinyl monomer is usually 0.01 to 20% by weight, preferably 0.05 to 15% by weight and more preferably 0.1 to 10% by weight, the content of the conjugated diene monomer is usually 40 to 94.99% by weight, preferably 50 to 85% by weight and more preferably 55 to 80% by weight, and the content of the aromatic vinyl monomer is usually 5 to 55% by weight, preferably 10 to 45% by weight and 15 to 40% by weight.

The amino group-containing vinyl monomer is not particularly limited, provided that it is a polymerizable monomer containing at least amino group selected from primary, secondary and tertiary amino groups in the molecule. Of these, a primary amino group and a tertiary amino group are preferable, and a tertiary amino group is especially preferable. These amino group-containing vinyl monomers may be used either alone or in combination.

As examples of the primary amino group-containing vinyl monomer, there can be mentioned acrylamide, methacrylamide, p-aminostyrene, aminomethyl acrylate, aminomethyl methacrylate, aminoethyl acrylate, aminoethyl methacrylate, aminopropyl acrylate, aminopropyl methacrylate, aminobutyl acrylate and aminobutyl methacrylate.

As examples of the secondary amino group-containing vinyl monomer, there can be mentioned anilinostyrenes described in Japanese Unexamined Patent Publication No. 61-130355; anilinophenylbutadienes described in Japanese Unexamined Patent Publication No. 61-130356; and methylacryamide, ethylacrylamide, methylmethacryamide, ethylmethacrylamide, N-mono-substituted acrylamides such as N-methylolacrylamide, and N-mono-substituted methacrylamides such as N-(4-anilionophenyl)methacrylamide.

As examples of the tertiary amino group-containing vinyl monomer, there can be mentioned N,N-di-substituted-aminoalkylacrylates, N,N-di-substituted-aminoalkylmethacrylates, N,N-di-substituted-aminoalkylacrylamides, N,N-di-substituted-aminoalkylacrylmethacrylamides, N,N-di-substituted-aminoaromatic vinyl compounds and pyridyl group-containing vinyl compounds.

As specific examples of the N,N-di-substituted-aminoalkyl acrylates and N,N-di-substituted-aminoalkyl methacrylates, there can be mentioned N,N-dimethylaminomethyl acrylate, N,N-dimethylaminomethyl methacrylate, N,N-dimethylaminoethyl acrylate, N,N-dimethylaminoethyl methacrylate, N,N-dimethylaminopropyl acrylate, N,N-dimethylaminopropyl methacrylate, N,N-dimethylaminobutyl acrylate, N,N-dimethylaminobutyl methacrylate, N-methyl-N-ethylaminoethyl acrylate, N-methyl-N-ethylaminoethyl methacrylate, N,N-dipropylaminoethyl acrylate, N,N-dipropylaminoethyl methacrylate, N,N-dibutylaminoethyl acrylate, N,N-dibutylaminoethyl methacrylate, N,N-dibutylaminopropyl acrylate, N,N-dibutylaminopropyl methacrylate, N,N-dibutylaminobutyl acrylate, N,N-dibutylaminobutyl methacrylate, N,N-dihexylaminoethyl acrylate, N,N-dihexylaminoethyl methacrylate, N,N-dioctylaminoethyl acrylate, N,N-dioctylaminoethyl methacrylate and acryloylmorpholine. Of these, acrylic acid esters such as N,N-dimethylaminoethyl acrylate, N,N-diethylaminoethyl acrylate, N,N-dipropylaminoethyl acrylate, N,N-dioctylaminoethyl acrylate and N-methyl-N-ethylaminoethyl acrylate, and methacrylic acid esters such as N,N-dimethylaminoethyl methacrylate, N,N-diethylaminoethyl methacrylate, N,N-dipropylaminoethyl methacrylate, N,N-dioctylaminoethyl methacrylate and N-methyl-N-ethylaminoethyl methacrylate are preferable.

As specific examples of the N,N-di-substituted-aminoalkylacrylamides and N,N-di-substituted-aminoalkylmethacrylamides, there can be mentioned N,N-dimethylaminomethylacrylamide, N,N-dimethylaminomethylmethacrylamide, N,N-dimethylaminoethylacrylamide, N,N-dimethylaminoethylmethacrylamide, N,N-dimethylaminopropylacrylamide, N,N-dimethylaminopropylmethacrylamide, N,N-dimethylaminobutylacrylamide, N,N-dimethylaminobutylmethacrylamide, N,N-diethylaminoetliylacrylamide, N,N-diethylaminoethylmethacrylamide, N,N-diethylaminopropylacrylamide, N,N-diethylaminopropylmethacrylamide, N,N-diethylaminobutylacrylamide, N,N-diethylaminobutylmethacrylamide, N-methyl-N-ethylaminoethylacrylamide, N-methyl-N-ethylaminoethylmethacrylamide, N,N-dipropylaminoethylacrylamide, N,N-dipropylaminoethylmethacrylamide, N,N-dibutylaminoethylacrylamide, N,N-dibutylaminoethylmethacrylamide, N,N-dibutylaminopropylacrylamide, N,N-dibutylaminopropylmethacrylamide, N,N-dibutylaminobutylacrylamide, N,N-dibutylaminobutylmethacrylamide, N,N-dihexylaminoethylacrylamide, N,N-dihexylaminoethylmethacrylamide, N,N-dihexylaminopropylacrylamide, N,N-dihexylaminopropylmethacrylamide, N,N-dioctylaminopropylacrylamide and N,N-dioctylaminopropylmethacrylamide. Of these, N,N-dimethylaminopropylacrylamide, N,N-dimethylaminopropylmethacrylamide, N,N-diethylaminopropylacrylamide, N,N-diethylaminopropylmethacrylamide, N,N-dioctylaminopropylacrylamide and N,N-dioctylaminopropylmethacrylamide are preferable.

As specific examples of the N,N-di-substituted-amino aromatic vinyl compounds, there can be mentioned styrene derivatives such as N,N-dimethylaminoethylstyrene, N,N-diethylaminoethylstyrene, N,N-dipropylaminoethylstyrene and N,N-dioctylaminoethylstyrene.

As specific examples of the pyridyl group-containing compounds, there can be mentioned 2-vinylpyridine, 4-vinylpyridine, 5-methyl-2-vinylpyridine and 5-ethyl-2-vinylpyridine. Of these, 2-vinylpyridine and 4-vinylpyridine are preferable.

As specific examples of the conjugated diene monomers, there can be mentioned 1,3-butadiene, 2-methyl-1,3-butadiene, 2,3-dimethyl-1,3-butadiene, 2-chloro-1,3-butadiene and 1,3-butadiene. Of these, 1,3-butadiene and 2-methyl-1,3-butadiene are preferable, and 2-methyl-1,3-butadiene is especially preferable. The conjugated diene monomers may be used either alone or in combination.

As specific examples of the aromatic vinyl monomers, there can be mentioned styrene, α-methylstyrene, 2-methylstyrene, 3-methylstyrene, 4-methylstyrene, 2,4-diisopropylstyrene, 2,4-dimethylstyrene, 4-t-butylstyrene, 5-t-butyl-2-methylstyrene, monochlorostyrene, dichlorostyrene and monofluorostyrene. Of these, styrene is preferable. These aromatic vinyl monomers may be used either alone or in combination.

If desired, the amino group-containing diene rubber can contain units of monoolefinic monomers other than the above-mentioned monomers. As examples of the monoolefinic monomers, there can be mentioned acrylic acid esters and methacrylic acid esters such as methyl acrylate, methyl methacrylate, ethyl acrylate, 2-ethylhexyl acrylate, 2-ethylhexyl methacrylate, hydroxyethyl acrylate and hydroxyethyl methacrylate; acrolein, vinyl chloride and vinyl acetate. These monoolefinic monomers may be used in an amount such that the object of the present invention can be achieved, and is usually used in an amount of smaller than 30% by weight.

The polymerization procedure by which the amino group-containing diene rubber is prepared is not particularly limited, and there can be mentioned suspension, bulk and emulsion polymerization procedures using a radical initiator. Of these, an emulsion polymerization is preferable.

The emulsion polymerization can be conducted by an ordinary procedure wherein, for example, predetermined amounts of the above-mentioned monomers are dispersed in an aqueous medium by using an emulsifier, and an emulsion polymerization is effected by using a radical polymerization initiator. As the emulsifier, for example, a long chain fatty acid salt having at least 10 carbon atoms and/or a rosinate is used. As specific examples of the emulsifier, there can be mentioned potassium salts and sodium salts of caprylic acid, lauric acid, myristic acid, palmitic acid, oleic acid and stearic acid. As examples of the radical polymerization initiator, there can be mentioned persulfate salts such as ammonium persulfate and potassium persulfate; and a redox initiators such as a combination of ammonium persulfate with ferric sulfate, a combination of an organic peroxide with ferric sulfate, and a combination of hydrogen peroxide with ferric sulfate.

A chain transfer agent can be used for modifying the molecular weight of the copolymer. The chain transfer agent used includes, for example, mercaptans such as t-dodecyl mercaptan and n-dodecyl mercaptan, thioglycolic acid, diterpene, terpinolene and γ-terpinene.

The temperature in the emulsion polymerization varies depending upon the particular kind of a radical polymerization procedure, and is usually in the range of 0 to 100° C., preferably 0 to 60° C. The manner in which the emulsion polymerization is conducted is any of continuous, batchwise and other manners.

When the conversion is large in the emulsion polymerization, the polymer readily become gel. Thus the conversion of polymerization is preferably not larger than 80%, and more preferably 40 to 70%. Termination of the polymerization is effected usually by adding a short-stopping agent when the desired polymerization conversion is reached. As the shortstopping agent, there can be mentioned amines such as diethylhydroxylamine and hydroxylamine, quinones such as hydroquinone and benzoquinone, sodium nitrite and sodium dithiocarbamate.

After the termination of the emulsion polymerization, unreacted monomers are removed from the produced polymer latex, and, if desired, an acid such as nitric acid or sulfuric acid is added to adjust the pH value to a predetermined value, and then a salt such as sodium chloride, calcium chloride or potassium chloride is incorporated to coagulate the polymer latex into a crumb. The crumb is washed with water, dehydrated and then dried by using, for example, a band dryer to give the intended amino group-containing diene rubber.

Other Diene Rubbers (B)

The amino group-containing diene rubber (A) can be used alone as the sole diene rubber ingredient, but may be used in combination with other diene rubbers (B). In the case where other diene rubbers (B) are used, the proportion of the amino group-containing diene rubber (A) in the total amount of the diene rubbers is appropriately determined depending upon the particular object and use of the rubber composition, but is usually at least 10% by weight, preferably 15 to 85% by weight, and more preferably 20 to 80% by weight. In other words, the ratio of (A)/(B) by weight is usually 10/90 to 100/0, preferably 15/85 to 85/15 and more preferably 20/80 to 80/20. When the proportion of the amino group-containing diene rubber (A) is too small, the intended modifying effect is difficult to obtain.

As examples of the other diene rubbers (B), there can be mentioned natural rubber (NR), polyisoprene rubber (IR), emulsion-polymerized styrene-butadiene copolymer rubber (SBR), solutiori-polymerized random SBR (bound styrene content: 5 to 50% by weight, 1,2-bond content in the butadiene units: 10 to 80%), high-trans SBR (trans content in the butadiene units: 70 to 95%), low-cis butadiene rubber (BR), high-cis BR, high-trans BR (trans content in the butadiene units: 70 to 95%), styrene-isoprene copolymer rubber (SIR), butadiene-isoprene copolymer rubber, solution-polymerized random styrene-butadieneisoprene copolymer rubber (SIBR), emulsion-polymerized SIBR, emulsion-polymerized styrene-acrylonitrile-butadiene copolymer rubber, acrylonitrile-butadiene copolymer rubber, butyl rubber, halogenated butyl rubber, ethylene-propylene-diene terpolymer rubber, epichlorohydrin rubber, and block copolymers such as high-vinyl SBR-low-vinyl SBR block copolymer rubber and polystyrene-polybutadiene-polystyrene block copolymer. The kind of the diene rubbers can be appropriately chosen depending upon the desired properties. These diene rubbers may be used either alone or in combination. Of these, NR, BR, IR, SBR and SIBR are preferable. In view of the processing property, NR and IR are especially preferable.

In the case where the amino group-containing diene rubber (A) is used in combination with the other diene rubber (B), preferable compositions include, for example, a composition of 20 to 80% by weight, more preferably 30 to 70% by weight, of an amino group-containing diene rubber (A) and 80 to 20% by weight, more preferably 70 to 30% by weight, of NR and/or IR, and a composition of 80 to 20% by weight of an amino group-containing diene rubber, 10 to 70% by weight of NR and/or IR and 10 to 70% by weight of SBR.

Silica Reinforcing Agent

The silica used is not particularly limited, and conventional silica widely used for general-purpose rubbers is used. As specific examples of the silica, there can be mentioned dry process white carbon, wet process white carbon, colloidal silica and precipitated silica described in Japanese Unexamined Patent Publication No. 62-62838. Of these, wet process white carbon predominantly comprised of silicic acid hydride is preferable. The silica may be used either alone or in combination.

The specific surface area of the silica is not particularly limited, but, in view of good reinforcing effect, good abrasion resistance and reduced heat build-up, the nitrogen adsorption specific surface area as determined by the BET method is usually in the range of 50 to 400 $m^2/g$, preferably 100 to 250 $m^2/g$ and more preferably 120 to 190 $m^2/g$. The nitrogen adsorption specific surface area is determined by the BET method according to ASTM D3037-81.

The amount of silica in the diene rubber composition is 10 to 120 parts by weight, preferably 20 to 100 parts by weight and more preferably 30 to 80 parts by weight, based on 100 parts by weight of the diene rubber ingredient. If the amount of silica is too small, the reinforcing effect is poor and the heat build-up is large. In contrast, if the amount of silica is too large, the heat build-up is large and the abrasion resistance is poor.

In the rubber composition of the present invention, silica can be incorporated in combination with carbon black as reinforcing agents. The carbon black used is not particularly limited, and conventional carbon black widely used for general purpose rubbers can be used. As specific examples of the carbon black, there can be mentioned furnace black, acetylene black, thermal black, channel black and graphite. Of these, furnace black is preferable. Furnace black includes those of various grades, which are, for example, SAF, ISAF, ISAF-HS, ISAF-LS, IISAF-HS, HAF, HAF-HS, HAF-LS and FEF. The carbon may be used either alone or in combination.

The specific surface area of the carbon black is not particularly limited, but, in view of good tensile properties and good abrasion resistance, the nitrogen adsorption specific surface area ($N_2SA$) is usually in the range of 5 to 200 $m^2/g$, preferably 50 to 150 $m^2/g$ and more preferably 80 to 130 $m^2/g$. The adsorption of dibutyl phthalate (DBP) is not particularly limited, but the carbon black usually exhibits a DBP adsorption of 5 to 300 ml/100 g, preferably 50 to 200 ml/100 g and more preferably 80 to 160 ml/100 g.

The amount of carbon black is not particularly limited, but is usually in the range of 0.5 to 100 parts by weight, preferably 1 to 80 parts by weight and more preferably 5 to 50 parts by weight, based on 100 parts by weight of the diene rubber ingredient.

If desired, other reinforcing agents can be incorporated in the rubber composition of the present invention. Such reinforcing agents are not particularly limited provided that they are industrially used. The reinforcing agents include, for example, calcium carbonate, talc and clay. These reinforcing agents are used in amounts such that the intended properties of the rubber composition of the present invention are not adversely influenced, and the amount is usually not larger than 50% by weight based on 100 parts by weight of the diene rubber ingredients.

Silane Coupling Agent

When a silane coupling agent is incorporated in combination with the silica with the diene rubber ingredient, the heat build-up is more suppressed and the abrasion resistance is more enhanced.

The silane coupling agent used is not particularly limited. As examples of the silane coupling agent, there can be mentioned vinyltrichlorosilane, vinyltriethoxysilane, vinyltris(β-methoxy-ethoxy)silane, β-(3,4-epoxycyclohexyl)-ethyltrimethoxysilane, γ-glycidoxypropyltrimethoxysilane, γ-methacryloxypropyltrimethoxysilane, N-(β-aminoethyl)-γ-aminopropylmethyldimethoxysilane, N-phenyl-γ-aminopropyl-trimethoxysilane, γ-chloropropyltrimethoxysilane, γ-mercaptopropyltrimethoxysilane, γ-aminopropyltriethoxysilane, bis(3-[triethoxysilyl]propyl) tetrasulfide, and tetrasulfides such as γ-trimethoxysilylpropyldimethylthiocarbamyl-tetrasulfide and γ-trimethoxysilylpropylbenzothizyl-tetrasulfide, which are described in Japanese Unexamined Patent Publication No. 6-248116.

The amount of the silane coupling agent is usually in the range of 0.1 to 30 parts by weight, preferably 1 to 20 parts by weight and more preferably 2 to 10 parts by weight, based on 100 parts by weight of the above-mentioned silica.

Vulcanizer

The vulcanizer used is not particularly limited, and includes, for example, sulfur such as powdery sulfur, precipitated sulfur, colloidal sulfur, insoluble sulfur and highly dispersible sulfur; sulfur halides such as sulfur monochloride and sulfur dichloride; organic peroxides such as dicumyl peroxide and di-tert.-butyl peroxide; metal oxides such as zinc oxide, magnesium oxide and lead oxide; quinone dioximes such as p-quinone dioxime and p,p'-dibenzoylquinone dioxime; organic polyvalent amine compounds such as triethylenetetramine, hexamethylenediamine carbamate and 4,4'-methylene-bis-o-chloroaniline; and alkylphenol resins having methylol groups.

The amount of the vulcanizer is usually 0.1 to 15 parts by weight, preferably 0.3 to 10 parts by weight and more preferably 0.5 to 5 parts by weight, based on 100 parts by weight of the diene rubber ingredient. If the amount of vulcanizer is too small, the tensile properties and abrasion resistance are poor. In contrast, if the amount of vulcanizer is too large, the heat build-up and the permanent set are undesirably large.

Vulcanization Accelerator

As a vulcanization accelerator, sulfenamide vulcanization accelerators are used. The sulfenamide vulcanization accelerators are not particularly limited provided and include those which are generally used. Preferable sulfenamide vulcanization accelerators exhibit a delayed vulcanization accelerating action. As examples of the sulfenamide vulcanization accelerators, there can be mentioned N-cyclohexyl-2-benzothiazole sulfenamide, N-t-butyl-2-benzothiazole sulfenamide, N-oxyethylene-2-benzothiazole sulfenamide and N,N'-diisopropyl-2-benzothiazole sulfenamide. These sulfenamide vulcanization accelerators may be used either alone or in combination.

The amount of the sulfenamide vulcanization accelerators is usually in the range of 0.1 to 15 parts by weight, preferably 0.3 to 10 parts by weight and more preferably 0.5 to 5 parts by weight, based on 100 parts by weight of the diene rubber ingredient. If the amount of the sulfenamide vulcanization accelerator is too small, the tensile properties and abrasion resistance are not improved to the desired extent. In contrast if the amount of the sulfenamide vulcanization accelerator is too large, the strength and hardness are poor.

If desired, other vulcanization accelerators be used in combination with the sulfenamide vulcanization accelerator in the rubber composition of the present invention. As examples of the other vulcanization accelerators, there can be mentioned guanidine vulcanization accelerators such as diphenylguanidine, diorthotolylguanidine and orthotolylbiguanidine; thiourea vulcanization accelerators such as thiocarboanilide, diorthotolylthiourea, ethylene thiourea, diethylthiourea and trimethylthiourea; thiazole vulcanization accelerators such as 2-mercaptobenzothiazole, dibenzothiazyl disulfide, 2-mercaptobenzothiazole zinc salt, 2-mercaptobenzothiazole sodium salt, 2-mercaptobenzothiazole cyclohexylamine salt and 2-(2,4-dinitrophenylthio)benzothiazole; thiuram vulcanization accelerators such as tetramethylthiuram monosulfide, tetramethylthiuram disulfide, tetraethylthiuram disulfide, tetrabutylthiuram disulfide and dipentamethylenethiuram tetrasulfide; dithiocarbamate vulcanization accelerators such as sodium dimethyldithiocarbamate, sodium diethyldithiocarbamate, sodium di-n-butyldithiocarbamate, lead dimethyldithiocarbamate, zinc dimethyldithiocarbamate, zinc diethyldithiocarbamate, zinc di-n-butyldithiocarbamate, zinc pentamethylenedithiocarbamate, zinc ethylphenyldithiocarbamate, tellurium diethyldithiocarbamate, selenium dimethyldithiocarbamate, selenium diethyldithiocarbamate, copper dimethyldithiocarbamate, iron dimethyldithiocarbamate, diethylamine diethyldithiocarbamate, piperidine pentamethylenedithiocarbamate and pipecoline methylpentamethylenedithiocarbamate; and xanthogenate vulcanization accelerators such as sodium isopropylxanthogenate, zinc isopropylxanthogenate and zinc butylxanthogenate. The amount of these vulcanization accelerators is not particularly limited provided that the object of the present invention can be achieved. Usually the amount is in the range of 0 to 5 parts by weight based on 100 parts by weight of the diene rubber ingredient.

Rubber Composition

The rubber composition of the present invention can be incorporated therein desired amounts of ingredients in addition to the above-mentioned ingredients in a conventional manner. Such ingredients include a vulcanization promotor, an aging stabilizer, an activator, a plasticizer, a lubricant and a filler. As examples of such ingredients, there can be mentioned a vulcanization promotor such as stearic acid and zinc oxide, coupling agents other than silane coupling agents, activators such as diethylene glycol, polyethylene glycol and silicone oil, fillers, plasticizers, aging stabilizers and processing oils. Appropriate ingredients can be chosen from these ingredients depending upon the particular use and object.

The rubber composition of the present invention can be prepared by kneading the ingredients by an ordinary procedure. For example, a diene rubber ingredient is kneaded together with ingredients other than a vulcanizer and a vulcanization accelerator, and then the vulcanizer and the vulcanizing accelerator are incorporated in the mixture to yield the rubber composition.

The kneading of the diene rubber ingredient together with ingredients other than the vulcanizer and the vulcanizing accelerator can be conducted by a process wherein the diene rubber ingredient and at least a part of silica are mixed together by using a mixer such as a roll or a Banbury mixer, followed by the addition of the ingredients other than the vulcanizer and the vulcanization accelerator. This procedure is beneficial for enhancing the dispersibility of the respective ingredients and yielding a rubber composition of good properties. Silica may be added either at a time or in lots. The divided addition of twice or more enhances the dispersibility thereof, especially promotes the mixing of silica with the diene rubber ingredient. More specifically, 10 to 90% by weight of the total weight of silica is initially added and then the residual amount is added in twice or more.

The mixing of the diene rubber ingredient with silica is conducted usually at a temperature of 80 to 200° C., preferably 100 to 190° C. and more preferably 140 to 180° C. If the mixing temperature is too low, the abrasion resistance is improved only to a minor extent. In contrast, if the mixing temperature is too high, burning of the diene rubber ingredient occurs. The mixing time is usually at least 30 seconds, preferably 1 to 30 minutes. The mixture is cooled usually to a temperature below 100° C., preferably to a temperature in the range of room temperature to 80° C., and the vulcanizer and the vulcanizing accelerator are added and kneaded together. Then the kneaded mixture is subjected to a press vulcanization usually at a temperature of 120 to 200° C., preferably 140 to 180° C.

The invention will now be specifically described by the following production examples, examples of the invention and comparative examples. In these examples, % and parts are by weight unless otherwise specified.

Properties of polymer, rubber composition and cured rubber were determined as follows.

(1) Content of bound styrene in copolymer

The content of bound styrene in a copolymer was determined according to JIS K6383 (refractive index method).

(2) Content of amino group-containing monomer units in copolymer

The content of amino group-containing monomer units in a copolymer was determined as follows. The copolymer was dissolved in tetrahydrofuran, and then coagulated with a methanol/acetone (50/50% by mole) mixture. The coagulation was repeated twice, and then the coagulated copolymer was dried under vacuum. The measurement was conducted by $^1$H-NMR at 500 MHz.

(3) Mooney viscosity ($ML_{1+4}$, 100° C.)

The Mooney viscosity was determined according to JIS K6301.

(4) Tensile modulus

300% tensile modulus ($kgf/cm^2$) was determined according to JIS K6301.

(5) Heat build-up

The heat build-up was determined by measuring tan by using RDA-II supplied by Rheometrics Co. at a twist of 0.5%, a frequency of 20 Hz and a temperature of 20° C. The tan value was converted to an index of tan 60° C.

(6) Abrasion resistance

The abrasion resistance was determined according to ASTM D2228 by using a Pico abrasion tester and expressed by the Pico abrasion resistance index.

PRODUCTION EXAMPLES 1 to 5

A reactor provided with a stirrer was charged with 200 parts of water, 3 parts of rosin soap, 0.2 part of t-dodecyl mercaptan, and predetermined amounts of monomers which are shown in Table 1. The reactor was maintained at 5° C., and, as a radical polymerization initiator, 0.1 part of cumene hydroperoxide, 0.2 part of sodium formaldehydesulfoxylate and 0.01 part of ferric sulfate were added to initiate polymerization. When the conversion reached 60%, diethylhydroxylamine was added to terminate the polymerization. Unreacted monomers were recovered from a polymer latex and the polymer latex was coagulated to give a crumb. The crumb was dried by a crumb dryer to yield diene rubbers No. 1 to 5. The properties of the diene rubbers are shown in Table 1.

TABLE 1

| Diene rubber No. | 1 | 2 | 3 | 4 | 5 |
| --- | --- | --- | --- | --- | --- |
| Amount charged (parts) | | | | | |
| Butadiene | 55.0 | 70.0 | 70.0 | 70.0 | 70.0 |
| Styrene | 42.5 | 29.0 | 29.2 | 28.5 | 30.0 |
| DM *1 | 2.5 | — | — | — | — |
| DMAPAA *2 | — | 1.0 | — | — | — |
| 4VP *3 | — | — | 0.8 | 1.5 | — |
| Content of bound monomer units | | | | | |
| Styrene | 33.3 | 21.9 | 21.6 | 20.8 | 22.6 |
| Amino group-containing monomer | 3.1 | 0.7 | 0.7 | 1.4 | — |
| Mooney viscosity ($ML_{1+4}$, 100° C.) | 55 | 52 | 52 | 54 | 56 |

*1 DM Dimethylaminoethyl methacrylate
*2 DMAPAA Dimethylaminopropylacrylamide
*3 4VP 4-vinylpyridine

EXAMPLES 1 TO 5, AND COMPARATIVE EXAMPLES 1, 2

Using diene rubbers No. 1 to 3 and 5 as raw material rubber, rubber composition were prepared according to the recipe shown in Table 2. The entire amount of diene rubber, a half amount of silica, a half amount of a silane coupling agent were mixed together at 170° C. for 2 minutes by using a 250 ml Brabender mixer, the ingredients other than the vulcanizer and the vulcanizing accelerator were added and mixed together at the same temperature for 3 minutes. The amounts of the raw material rubber, silica, silane coupling agent, aroma-oil and vulcanization accelerator are shown in Table 2.

The rubber mixture was kneaded together with sulfur and the vulcanization accelerator by an open roll at 50° C., and subjected to press-vulcanization at 160° C. for 30 minutes to give a specimen. Properties of the specimen were evaluated. The results are shown in Table 3.

TABLE 2

| Recipe 1 (mixing steps) | First | Second | Third |
| --- | --- | --- | --- |
| Raw material rubber | Whole | — | — |
| Silica *1 | Half | Half | — |
| Silane coupling agent *2 | Half | Half | — |
| Aroma-oil | — | Varied | — |
| Zinc oxide | — | 3 | — |
| Stearic acid | — | 2 | — |
| Aging stabilizer *3 | — | 1 | — |
| Sulfur | — | — | 2 |
| Vulc. accelerator *4 | — | — | Varied |

*1 Silica: Ultrasil VN3 (supplied by Degussa Co., nitrogen adsorption specific surface area: 175 $m^2$)
*2 Silane coupling agent: Si69 (supplied by Degussa Co.)
*3 Aging stabilizer: Nocrac 6C (supplied Ohuchi Shinko K.K.)
*4 Vulcanization accelerator: Nocceler CZ (supplied by Ohuchi Shinko K.K.)

TABLE 3

|  | Examples | | | | | Co. Ex. |
| --- | --- | --- | --- | --- | --- | --- |
|  | 1 | 2 | 3 | 4 | 5 | 1 |
| Ingredients (parts) | | | | | | |
| Diene rubber No. 1 | 100 | — | — | — | — | — |
| Diene rubber No. 2 | — | 100 | — | 100 | 100 | — |
| Diene rubber No. 3 | — | — | 100 | — | — | — |
| Diene rubber No. 5 | — | — | — | — | — | 100 |
| Silica | 50 | 50 | 50 | 65 | 80 | 50 |
| Silane coupling agent | 3.0 | 3.0 | 3.0 | 3.9 | 4.8 | 3.0 |
| Aroma-oil | 10 | 10 | 10 | 20 | 30 | 10 |
| Vulcanization accelerator | 2.0 | 2.0 | 2.0 | 2.5 | 3.0 | 2.0 |
| Properties | | | | | | |
| 300% tensile modulus (kgf/cm$^2$) | 135 | 113 | 118 | 126 | 152 | 90 |
| Tan δ 60° C. index *1 | 115 | 119 | 121 | 112 | 105 | 100 |
| Abrasion resistance index *1 | 114 | 120 | 123 | 126 | 132 | 100 |

*1 These indexes are values relative to those (100) of Comparative Example 1

As seen from Table 3, the rubber compositions of the present invention (Examples 1 to 5) have excellent tensile property, heat build-up and abrasion resistance.

EXAMPLES 6 TO 10, AND COMPARATIVE EXAMPLE 2

Using silica shown in Table 5 and according to the recipe shown in Table 4, rubber compositions were prepared, press-vulcanized and evaluated by the same procedures as described in Example 1. The results are shown in Table 5.

TABLE 4

| Recipe 2 (mixing steps) | First | Second | Third |
| --- | --- | --- | --- |
| Raw material rubber | Whole | — | — |
| Silica | Half | Half | — |
| Silane coupling agent *1 | 1.5 | 1.5 | — |
| Aroma-oil | — | 10 | — |
| Zinc oxide | — | 3 | — |
| Stearic acid | — | 2 | — |
| Aging stabilizer *2 | — | 1 | — |
| Sulfur | — | — | 2 |
| Vulcanization accelerator | — | — | Varied |

*1 Silane coupling agent: Si69 (Degussa Co.)
*2 Aging stabilizer: Nocrac 6C (Ohuchi Shinko K.K.)

TABLE 5

|  | Examples | | | | | Co. Ex. |
| --- | --- | --- | --- | --- | --- | --- |
|  | 6 | 7 | 8 | 9 | 10 | 2 |
| Ingredients (parts) | | | | | | |
| Diene rubber No. 4 | 100 | 100 | 100 | 100 | 100 | 100 |
| Silica *1 | 50 | — | — | — | — | — |
| Silica *2 | — | 50 | — | — | — | — |
| Silica *3 | — | — | 50 | — | — | — |
| Silica *4 | — | — | — | 50 | — | — |
| Silica *5 | — | — | — | — | 50 | 150 |
| Vulc. accelerator *6 | 2.0 | 2.0 | 2.0 | 2.0 | 2.0 | 5.0 |
| Properties | | | | | | |
| 300% tensile modulus (kgf/cm$^2$) | 95 | 108 | 126 | 140 | 165 | 182 |
| Tan δ 60° C. index *7 | 135 | 131 | 125 | 115 | 100 | 82 |

TABLE 5-continued

|  | Examples | | | | | Co. Ex. |
| --- | --- | --- | --- | --- | --- | --- |
|  | 6 | 7 | 8 | 9 | 10 | 2 |
| Abrasion resistance index *7 | 100 | 114 | 128 | 135 | 121 | 72 |

*1 Silica: Nipsil RS150 (supplied by Nippon Silica K.K.; nitrogen adsorption specific surface area: 80 m$^2$/g)
*2 Silica: Ultrasil VN2 (supplied by Degussa Co.; nitrogen adsorption specific surface area: 125 m$^2$/g)
*3 Silica: Ultrasil VN3 (supplied by Degussa Co.; nitrogen adsorption specific surface area: 175 m$^2$/g)
*4 Silica: Nipsil AQ (supplied by Nippon Silica K.K.; nitrogen adsorption specific surface area: 200 m$^2$/g)
*5 Silica: Nipsil VN3 (supplied by Nippon Silica K.K.; nitrogen adsorption specific surface area: 240 m$^2$/g)
*6 Vulcanization accelerator: Nocceller CZ (supplied by Ohuchi Shinkou K.K.)
*7 These indexes are values relative to those (100) of Comparative Example 1 in Table 3.

As seen from Table 5, the rubber compositions of the present invention (Examples 6 to 10) exhibit excellent and balanced tensile property, heat build-up and abrasion resistance irrespective of types of silica.

EXAMPLES 11, 12 AND COMPARATIVE EXAMPLES 3, 4

Using a vulcanization accelerator shown in Table 6 and according to the recipe employed in Example 7, rubber compositions were prepared, press-vulcanized and evaluated by the same procedures as employed in Example 7. The results are shown in Table 6.

TABLE 6

|  | Examples | | | Comp. Example | |
| --- | --- | --- | --- | --- | --- |
|  | 7 | 11 | 12 | 3 | 4 |
| Ingredients (parts) | | | | | |
| Diene rubber No. 4 | 100 | 100 | 100 | 100 | 100 |
| Vulc. accelerator *1 | 2 | — | 1 | — | — |
| Vulc. accelerator *2 | — | 2 | — | — | — |
| Vulc. accelerator *3 | — | — | — | 2 | 1 |
| Vulc. accelerator *4 | — | — | 1 | — | 1 |
| Properties | | | | | |
| 300% tensile modulus (kgf/cm$^2$) | 108 | 106 | 99 | 82 | 88 |
| Tan δ 60° C. index *5 | 131 | 129 | 116 | 104 | 107 |
| Abrasion resistance index *5 | 114 | 110 | 103 | 88 | 97 |

*1 Vulcanization accelerator: Nocceler CZ (sulfenamide; supplied by Ohuchi Shinkou K.K.)
*2 Vulcanization accelerator: Nocceler DZ (sulfenamide; supplied by Ohuchi Shinkou K.K.)
*3 Vulcanization accelerator: Nocceler D (guanidine; supplied by Ohuchi Shinkou K.K.)
*4 Vulcanization accelerator: Nocceler DM (thiazole; supplied by Ohuchi Shinkou K.K.)
*5 These indexes are values relative to those (100) of Comparative Example 1 in Table 3.

As seen from Table 6, the rubber compositions not containing a sulfenamide vulcanization promotor (Comparative Examples 3, 4) are inferior in tensile property and abrasion resistance. In contrast, the rubber compositions of the present invention containing a sulfenamide vulcanization promotor (Examples 7, 11, 12) exhibit excellent tensile property, abrasion resistance and heat build-up.

EXAMPLES 13 TO 17, AND COMPARATIVE EXAMPLES 5 to 7

Using silica shown in Table 8 and according to the recipe shown in Table 7, rubber compositions were prepared, press-vulcanized and evaluated by the same procedures as described in Example 1. The results are shown in Table 8.

TABLE 7

| Recipe 3 (mixing steps) | First | Second | Third |
|---|---|---|---|
| Raw material rubber | Whole | — | — |
| Silica | Half | Half | — |
| Carbon black | — | Whole | — |
| Silane coupling agent *1 | Half | Half | — |
| Aroma-oil | — | 30 | — |
| Zinc oxide | — | 3 | — |
| Stearic acid | — | 2 | — |
| Aging stabilizer *2 | — | 1 | — |
| Sulfur | — | — | 2 |
| Vulc. accelerator *3 | — | — | Varied |

*1 Silane coupling agent: Si69 (Degussa Co.)
*2 Aging stabilizer: Nocrac 6C (Ohuchi Shinko K.K.)
*3 Vulcanization accelerator: Nocceler CZ (Ohuchi Shinkou K.K)

TABLE 8

|  | Examples ||||| Comp. Examples |||
|---|---|---|---|---|---|---|---|---|
|  | 13 | 14 | 15 | 16 | 17 | 5 | 6 | 7 |
| Ingredients (parts) | | | | | | | | |
| Diene rubber No. 2 | 70 | 70 | 70 | 70 | 40 | 70 | 70 | — |
| Diene rubber No. 5 | — | — | — | — | — | — | — | 70 |
| BR *1 | 30 | 30 | 30 | — | 60 | 30 | 30 | 30 |
| NR *2 | — | — | — | 30 | — | — | — | — |
| Silica *3 | 80 | 60 | 40 | 60 | 60 | — | — | 60 |
| Silica *4 | — | — | — | — | — | 5 | — | — |
| Carbon black *5 | — | 20 | 40 | 20 | 20 | 75 | 80 | 20 |
| Silane coupling agent | 4.4 | 3.3 | 2.2 | 3.3 | 3.3 | 3.3 | — | 3.3 |
| Vulc. accelerator | 3.5 | 3.0 | 2.5 | 3.0 | 3.0 | 3.0 | 1.5 | 3.0 |
| Properties | | | | | | | | |
| 300% tensile modulus (kgf/cm$^2$) | 158 | 157 | 155 | 168 | 133 | 152 | 150 | 135 |
| Tan δ 60° C. index *6 | 114 | 113 | 109 | 107 | 120 | 92 | 90 | 100 |
| Abrasion resistance index *6 | 111 | 113 | 118 | 116 | 119 | 116 | 113 | 100 |

*1 BR (supplied by Nippon Zeon Co., Mooney viscosity: 42, cis content in butadiene units: 96%)
*2 SMRCV60 (Mooney viscosity: 60)
*3 Ultrasil VN2 (supplied by Degussa Co.)
*4 Nipsil VN3 (supplied by Nippon Silica Co.)
*5 N220 (suppiied by Tokai Carbon K.K., nitrogen adsorption specific surface area: 120 m$^{21}$ /g, DBP adsorption: 115 ml/100 g)
*6 These indexes are values relative to those (100) of Comparative Example 7

INDUSTRIAL APPLICABILITY

The rubber composition of the present invention gives rubber articles exhibiting greatly enhanced tensile properties and abrasion resistance while a good rolling resistance inherent to a silica-incorporated rubber composition is retained.

In view of the above-mentioned characteristics, the rubber composition of the present invention can be widely used, for example, for tire parts such as tread, carcass, sidewall and bead; rubber articles such as hoses, sash-windows, belts, shoe soles, vibration isolators and automobile parts; and reinforcers for high-impact polystyrene and ABS resin. The rubber composition of the present invention is suitable especially for treads of low-fuel-consumption tires, and also suitable for treads, side-walls, undertreads, carcasses and beads of all-season tires, high-performance tires and studless tires.

We claim:

1. A rubber composition having improved tensile modulus and improved abrasion resistance comprising 100 parts by weight of a diene rubber, 10 to 120 parts by weight of silica, 0.1 to 15 parts by weight of a vulcanizer and 0.1 to 15 parts by weight of a vulcanization accelerator, wherein the diene rubber is (A) an amino group-containing diene rubber having a Mooney viscosity (ML$_{1+4}$, 100° C.) Of 20 to 250 or a mixture of said amino group-containing diene rubber (A) with other diene rubber (B), the silica has a nitrogen adsorption specific surface area of 100 to 250 m$^2$/g as measured by the BET method, and further the vulcanization accelerator is a sulfonamide compound.

2. The rubber composition according to claim 1, wherein the diene rubber is a mixture comprising, based on the weight of the sum of diene rubbers (A) and (B), 10 to 100% by weight of said amino group-containing diene rubber (A) with 90 to 0% by weight of the other diene rubber (B).

3. The rubber composition according to claim 1, wherein the amino group-containing diene rubber (A) contains at least one amino group selected from primary amino groups, secondary amino groups and tertiary amino groups.

4. The rubber composition according to any of claim 1, wherein said amino group-containing diene rubber (A) is a copolymer of an amino group-containing vinyl monomer and a conjugated diene monomer, or a copolymer of an amino group-containing vinyl monomer, a diene monomer and an aromatic vinyl monomer.

5. The rubber composition according to claim 4, wherein said copolymers comprise 0.01 to 20% by weight of amino group-containing vinyl monomer units, 40 to 99.99% by weight of conjugated diene monomer units and 0 to 55% by weight of aromatic vinyl monomer units.

6. The rubber composition according to claim 4, wherein said amino group-containing vinyl monomer is a tertiary amino group-containing vinyl monomer.

7. The rubber composition according to claim 4, which further comprises carbon black as reinforcing agent in addition to the silica.

8. The rubber composition according to claim 7, wherein the amount of carbon black is in the range of 0.5 to 100 parts by weight based on 100 parts by weight of the diene rubber.

9. The rubber composition according to claim 7, wherein the carbon black has a nitrogen adsorption specific surface area ($N_2SA$) of 5 to 200 $m^2/g$.

10. The rubber composition according to claim 7, wherein the carbon black has a dibutyl phthalate (DBP) adsorption of 5 to 300 ml/100 g.

11. The rubber composition according to claim 1, which further comprises a silane coupling agent.

12. The rubber composition according to claim 11, wherein the amount of the silane coupling agent is in the range of 0.1 to 30 parts by weight based on 100 parts by weight of the silica.

13. The rubber composition according to claim 1, wherein the vulcanizer is sulfur.

* * * * *